B. W. WHITWORTH.
ASSEMBLING TABLE FOR END GATES.
APPLICATION FILED SEPT. 9, 1918.

1,303,437.

Patented May 13, 1919.
3 SHEETS—SHEET 1.

Inventor,
B. W. Whitworth, by
G. C. Kennedy,
Attorney.

B. W. WHITWORTH.
ASSEMBLING TABLE FOR END GATES.
APPLICATION FILED SEPT. 9, 1918.
1,303,437.
Patented May 13, 1919.
3 SHEETS—SHEET 3.
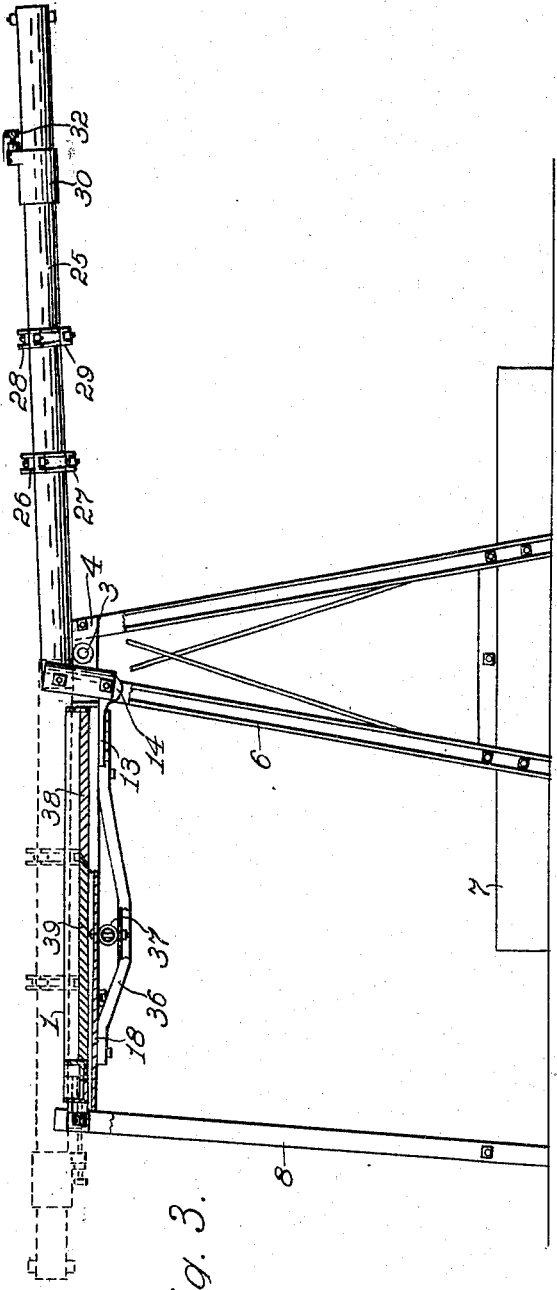
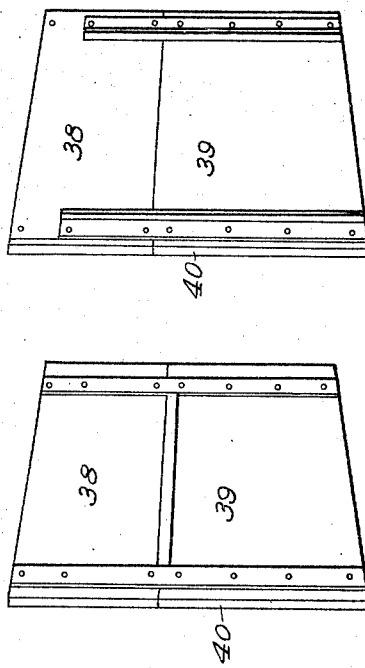
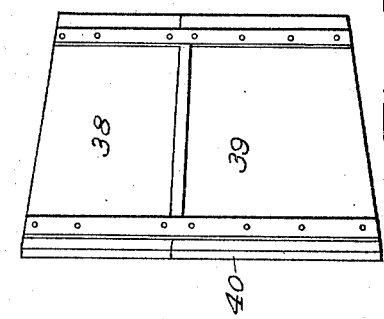
Inventor,
B. W. Whitworth, by
G. C. Kennedy
Attorney.

UNITED STATES PATENT OFFICE.

BEVILL W. WHITWORTH, OF CEDAR FALLS, IOWA, ASSIGNOR TO THOMAS A. WHITWORTH, OF CEDAR FALLS, IOWA.

ASSEMBLING-TABLE FOR END-GATES.

1,303,437.   Specification of Letters Patent.   Patented May 13, 1919.

Application filed September 9, 1918.   Serial No. 253,188.

*To all whom it may concern:*

Be it known that I, BEVILL W. WHITWORTH, a citizen of the United States of America, and a resident of Cedar Falls, Blackhawk county, Iowa, have invented certain new and useful Improvements in Assembling-Tables for End-Gates, of which the following is a specification.

My invention relates to assembling tables for wagon end-gates, and the object of my improvement is to supply a skeleton table, reversibly mounted, for holding end-gate parts while being assembled and secured together, said table having releasable clamping-means for holding such parts thereon while being operated upon from either side, and also having other adjustable devices for exercising compression upon certain of such parts as may be found necessary during the assembling operation.

Figure 1:
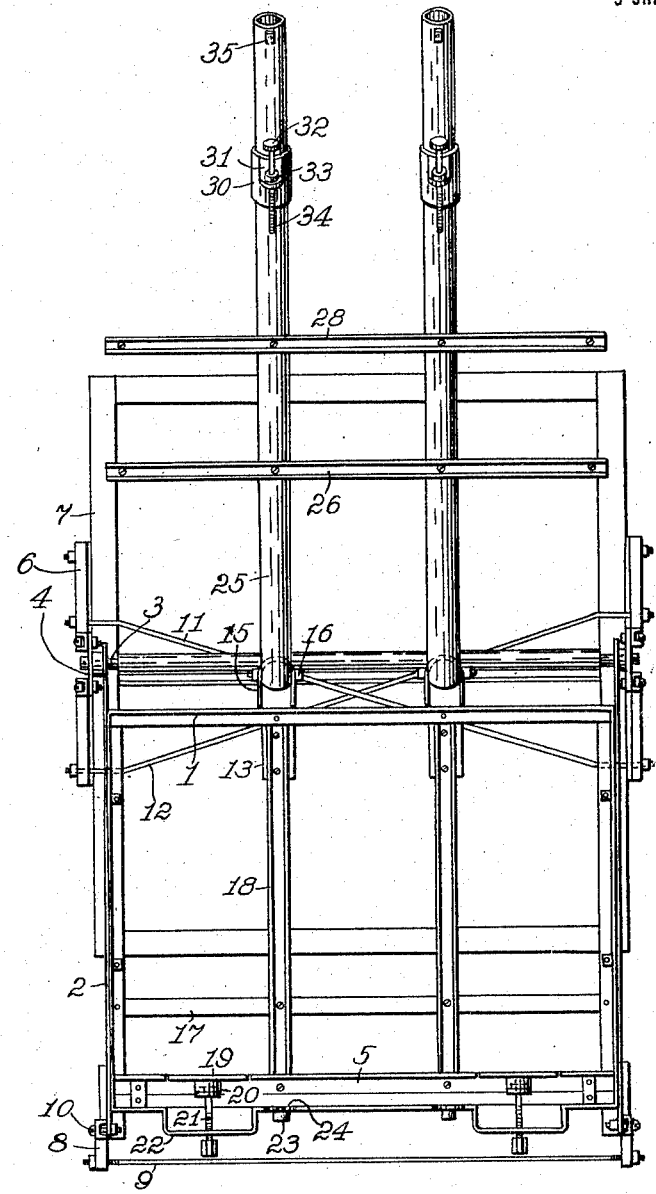
Figure 2:
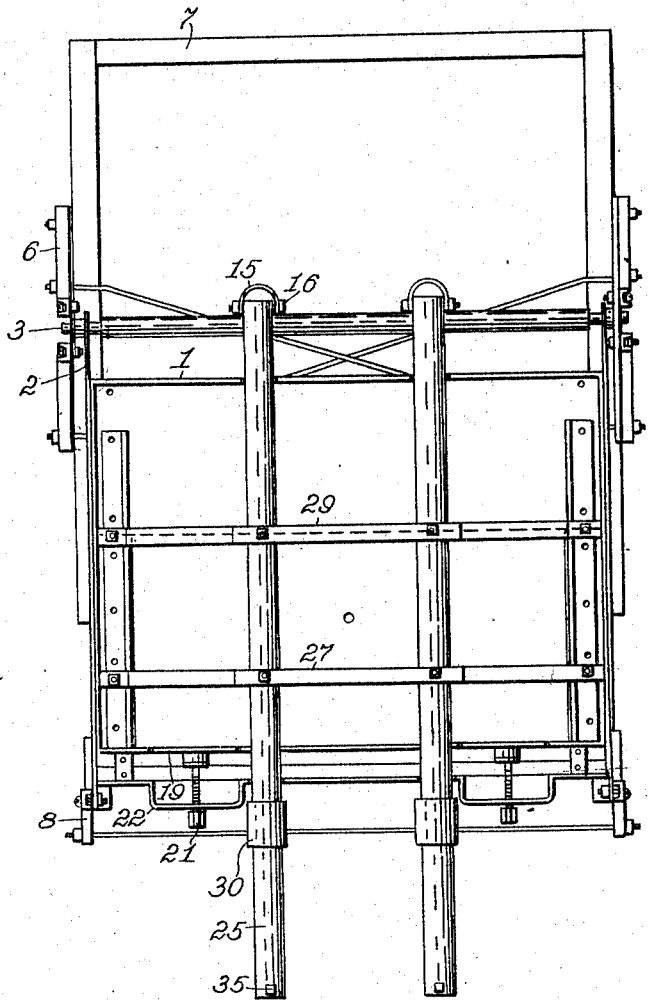

This object I have accomplished by the means which are hereinafter described and claimed, and which are illustrated in the accompanying drawings, in which Figure 1 is a top plan of my improved reversible assembling table, showing the hinged clamping-device in its extended or open position, and Fig. 2 is another plan view of said device, showing said clamping-means in its closed and secured position. Fig. 3 is a side elevation of said table with its said clamping device shown in full lines extended, and in dotted lines in secured position, parts of the table and its supporting-means being broken away.

Figs. 4 and 5 are respectively perspective views of the rear and front faces of a wagon end gate made up of assembled parts or sections, such as is adapted to be operated upon on my improved assembling table.

In said drawings, similar numerals of reference denote corresponding parts throughout the several views.

My device is intended for use in the rapid and accurate assemblage of the parts of sectional end-gates, such as is shown in said Figs. 4 and 5, wherein an end-gate is shown made up of a main body part 38 having depending members 40 secured thereto by vertically-disposed bars on the front, the latter overlapping a swinging gate part 39 fitted between said members, said gate to be operated by means not shown.

The assembling table for said end-gate parts is hingedly supported at one end on upwardly-converged legs 6 whose lower ends are bolted to opposite sides of a rectangular boxing 7, formed of connected beams.

The upper ends of each pair of legs 6 are fixedly connected by bars 4, the latter medially orificed to receive the extremities of a cross-shaft 3.

The assembling table is of skeleton construction, made up of angle-bars 1 secured together rectangularly and fastened to side bars 2 which latter have their opposite ends projecting beyond opposite ends of said table, said ends being orificed. Certain ends of said side bars 2 are by means of their said orifices mounted to rock on the end parts of said shaft 3. The opposite ends of said side bars 2 are connected by pivot-bolts 10 to ends of legs 8, and the lower parts of said legs 8 are fixedly connected by means of a cross-rod 9.

The front and rear end parts of said rectangular frame 1 are fixedly connected by means of spaced pairs of trussed channel-bars 18 and 36 medially separated by spacing-parts 37. The side-members of said frame 1 and said truss parts 18 are fixedly connected by a cross-bar 17.

To the under face of said frame are secured the rearwardly projecting bodies 13 provided with orificed lugs 14 to receive pivot-bolts which pivotally connect swinging elements 15 thereto. The numeral 25 denotes spaced longitudinally-arranged tubular beams, ends of which are pivotally connected to said elements 15 by other pivot-bolts 16, thus affording double-joint connections between said beams and said table.

The beams 25 are fixedly connected by means of spaced pairs of trussed cross-bars 26—27 and 28—29. On the outer ends of the beams 25 are slidably mounted the sleeves 30 provided with downwardly extending orificed lugs 31 to receive the plain parts of screws 34 having knurled heads 32 and integral annular flanges 33 to bear against the outer faces of said lugs, the threaded ends of the screws being adjustably receivable into interiorly threaded orifices in bosses 23 on the outer end of the frame 1, whereby the clamping-device described can be releasably secured upon the adjacent face of said table to secure the work thereon. Stops 35 are provided on the extremities of the beams 25 to prevent escape of the sleeves 30.

The numeral 5 denotes a cross angle-bar removably mounted across said frame 1 near but spaced from its outer or free end, and having its upstanding flange cut away at two places. The free end of said frame has an outwardly extending pair of brackets 22, medially orificed to receive adjusting-screws 21, extremities of which are rotatably connected with socketed bosses 20 on short bars 19, the latter arranged crosswise of the frame to be brought into line with the flange of said angle-bar 5, through whose said openings they may pass back and forth, as the said screws are adjusted.

The supporting-legs 6 are braced by cross-rods 11 and 12. The frame 1 has notches 24 to receive and lock the beams 25 against transverse displacement, when in closed position.

The end-gate parts shown in said Figs. 4 and 5 are placed within said frame, after the clamping-device is swung back as shown in Fig. 3 in full lines, and then the clamping-device is swung forward into closed position and releasably secured to the frame to clamp the work thereon, by the fastening-means 30 to 34 coacting with said threaded socketed bosses 23 on the frame. The frame trussed-bars, as also the clamping-device trussed bars firmly clamp the work between them. The table, when said clamping-device is clamped down upon it, may be swung over reversely, to expose the opposite faces of the inclosed end-gate parts for placing and securing of bolts or other operations, the table being supported in its reversed position by the pivoted legs 8. An end-gate of a certain height can be fitted in said table against the cross-bar flange 5, and the screws 21 operated to cause the bars 19 to compress the abutting edge of the gate part 39 to force the latter into a true fit with the part 38 of the gate. When a gate of greater height is to be assembled, the cross-bar 5 is removed, and the gate parts assembled within the frame flanges proper, the bars 19 being retracted sufficiently by means of said screws 21 so as to bear upon the part 39 of the gate in the same way.

By the above device, the parts of such an end-gate as that shown can be quickly and easily assembled with a minimum of labor.

Having described my invention, what I claim as new, and desire to secure by Letters Patent, is:

1. A device of the character described, comprising supporting-means, a table hinged reversibly to said supporting-means, means pivotally mounted on said table for holding said table in either of reversed positions, and means for clamping an object upon said table.

2. A device of the character described, comprising supporting-means, a table hinged reversibly to said supporting means, an element hinged to and supporting the free end of said table in either of reversed positions, and an adjustable device mounted on said table for effecting compression in one direction upon an object mounted upon the table.

3. A device of the character described, comprising supporting-means, a skeleton table hinged reversibly thereto, means hinged to the free end of said table for supporting it in either of reversed positions, and clamping-means movably assembled with one face of said table to releasably clamp an object thereon.

4. A device of the character described, comprising a skeleton table having fixedly coupled pairs of connecting braces between its ends, and a skeleton clamping-device mounted to swing to and from one face of the table and having transverse fixedly coupled pairs of connecting braces, said clamping-device with said braces being adapted to clamp articles upon said table releasably.

5. A device of the character described, comprising an open frame, another frame mounted hingedly on and including a double-joint thereover to clamp articles therebetween, means for securing said frames together releasably, and means mounted on said table for compressing in one direction an article mounted movably upon the first-mentioned frame.

6. A device of the character described, comprising an open frame, a cross-bar removably mounted on said frame in spaced relation with one end thereof and having openings, and compression devices mounted on said frame to pass through the openings in said cross-bar to exert adjustable compression on an end-gate element assembled with other end-gate elements upon said frame.

7. A device of the character described, comprising an open frame reversibly mounted to exposed either face upwardly, a clamping-device positioned over one face of said frame, and a double-joint hinge connection between said clamping-device and said frame.

8. In a device of the character described, an open frame, a spacing-body removably mounted thereon, and adjustable compressing-means mounted on one end of said frame, movable to and fro to compress articles mounted on said frame when said spacing body is either mounted on or removed from said frame.

Signed at Waterloo, Iowa, this 29th day of Aug., 1918.

BEVILL W. WHITWORTH.